US012761900B2

(12) United States Patent
Shahriari et al.

(10) Patent No.: US 12,761,900 B2
(45) Date of Patent: Oct. 13, 2026

(54) METHOD AND SYSTEM OF FLEET-BASED DATA ADAPTATION AND ADAPTATION BY DRIVER ASSISTANCE SYSTEMS OF INDIVIDUAL VEHICLES

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Hassan Askari, Thornhill (CA); SeyedAlireza Kasaiezadeh Mahabadi, Novi, MI (US); Mehdi Abroshan, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 18/672,486

(22) Filed: May 23, 2024

(65) Prior Publication Data

US 2025/0362898 A1 Nov. 27, 2025

(51) Int. Cl.

*G06F 16/953* (2019.01)
*B60W 50/06* (2006.01)
*G06F 8/65* (2018.01)
*G07C 5/02* (2006.01)
*G07C 5/08* (2006.01)
*B60W 50/00* (2006.01)

(52) U.S. Cl.

CPC ............... *G06F 8/65* (2013.01); *G07C 5/085* (2013.01); *B60W 50/00* (2013.01); *G06F 16/953* (2019.01)

(58) Field of Classification Search

CPC ......... G06F 8/65; G06F 16/953; B60W 50/00
See application file for complete search history.

(56) References Cited

U.S. PATENT DOCUMENTS

| | | | | |
|---|---|---|---|---|
| 10,288,745 | B2 | 5/2019 | Mudalige et al. | |
| 10,353,691 | B2 * | 7/2019 | Richter | G06F 8/65 |
| 11,132,897 | B2 | 9/2021 | McErlean et al. | |
| 2019/0266815 | A1 * | 8/2019 | Andrade | G06Q 10/08 |
| 2020/0019165 | A1 * | 1/2020 | Levandowski | B60W 30/182 |
| 2020/0247424 | A1 * | 8/2020 | Dudar | G05B 19/042 |
| 2022/0024494 | A1 * | 1/2022 | Bonanni | B60W 40/12 |
| 2023/0236036 | A1 | 7/2023 | Titsworth et al. | |

* cited by examiner

*Primary Examiner* — Anibal Riveracruz

(74) *Attorney, Agent, or Firm* — Ingrassia Fisher & Lorenz, LLP | IFL

(57) ABSTRACT

A method includes receiving input condition data of a plurality of remote vehicles in a fleet and used to generate automatic control commands at the vehicles to control the vehicles. The method then includes receiving actual output parameter measurement data from the remote vehicles and resulting from the use of the automatic control commands, and receiving or generating performance measurement data depending at least in part on differences between the actual output parameter measurement data and expected output parameter measurement data. Thereafter, the method determines whether one or more performance are deemed inadequate. The method updates a calibration control command-to-input conditions correlation using the data of the fleet database, and generating a calibration correction is based on the correlation and to be used to change or replace a previous control command value associated with the inadequate performance measurement. The calibration correction is then transmitted to the remote vehicles.

20 Claims, 10 Drawing Sheets

METHOD AND SYSTEM OF FLEET-BASED DATA ADAPTATION AND ADAPTATION BY DRIVER ASSISTANCE SYSTEMS OF INDIVIDUAL VEHICLES

BACKGROUND

Modern vehicles are becoming more automated, i.e., able to provide driving control with less and less driver intervention. Vehicle automation has been categorized into numerical levels ranging from zero, corresponding to no automation with full human control, to five, corresponding to full automation with no human control. Various driver-assistance systems, such as cruise control, adaptive cruise control, and parking assistance systems correspond to lower automation levels, while true "driverless" vehicles (or autonomous driving) correspond to higher automation levels. These systems have various adaptation and self-learning strategies that use the vehicle's own on-vehicle measurements to improve the driver-assistance performance on the single vehicle.

SUMMARY

In an example implementation, a method includes receiving input condition data of a plurality of remote vehicles in a fleet and used to generate automatic control commands at the vehicles to control the vehicles. The method includes receiving actual output parameter measurement data from the remote vehicles and resulting from the use of the automatic control commands, and receiving or generating performance measurement data depending at least in part on differences between the actual output parameter measurement data and expected output parameter measurement data. Thereafter, the performance measurement data, the input condition data, and the output parameter measurement data are placed into one or more fleet databases, and the method determines whether one or more performance measurements in the fleet database are deemed inadequate. The method updates a calibration control command-to-input conditions correlation using the data of the fleet database, and adapts one or more control commands related to the updating. adapting one or more control commands related to the updating. The method includes generating a calibration correction based on the correlation and to be used to change or replace a previous control command value associated with the inadequate performance measurement. Thereafter, the method is transmitting the calibration correction or the one or more control commands or both to the remote vehicles.

Also in accordance with another example implementation, the performance measurements are generated at the vehicles.

Also in accordance with another example implementation, the performance measurements are generated remotely from the vehicles.

Also in accordance with another example implementation, the calibration correction is part of a software or firmware update of a driver assistance program on the remote vehicles.

Also in accordance with another example implementation, the updating and generating comprises use of a calibration equation that factors fleet-based versions of one or more input conditions, one or more control commands, and one or more performance measurements.

Also in accordance with another example implementation, the updating includes determining a distribution of errors depending on one or more input conditions, and using the distribution to determine a correspondence between control commands and actual output parameters used to determine the performance measurements associated with one or more input conditions, and using the correspondence between control commands and actual output parameters to determine the control command-to-input conditions correlation.

Also in accordance with another example implementation, the method includes updating the fleet database with indications of which events triggers an inadequate performance measurement, wherein an event comprises corresponding input conditions, control commands, and output parameter measurements.

Also in accordance with another example implementation, the method includes updating the fleet database with updated control command-to-input conditions correlation data.

Also in accordance with another example implementation, the method includes testing the calibration correction on a test vehicle before transmitting the calibration correction to the fleet.

In another example implementation, a computing device includes memory storing driver assistance data; and processor circuitry forming one or more processors and being communicatively coupled to the memory. The processor is to operate by receiving input condition data of a plurality of remote vehicles in a fleet remote from the computing device and used to generate automatic control commands at the vehicles to control the vehicles; receiving actual output parameter measurement data from the remote vehicles; and receiving performance measurements depending at least in part on differences between the actual output parameter measurement data and expected output parameter measurement data depending on the automatic control commands. The processor also operates by placing the performance measurement data, the input condition data, and the output parameter measurement data into a fleet database; determining whether one or more performance measurements in the fleet database are deemed inadequate; updating a calibration control command-to-input conditions correlation using the data of the fleet database; generating a calibration correction based on the correlation and to be used to change or replace a previous control command value associated with the inadequate performance measurement; and transmitting the calibration correction to the remote vehicles.

Also in accordance with another example implementation, wherein the input condition data include a state of an individual vehicle comprising at least one of: location, orientation, vehicle speed, direction of motion, road surface conditions, position of objects relative to the vehicle, vehicle acceleration, vehicle deceleration, visibility, and light conditions.

Also in accordance with another example implementation, the input condition data includes an environment of the individual vehicles comprising at least one of: outdoor temperature, humidity, and ambient pressure.

Also in accordance with another example implementation, the processor further operates by obtaining input condition data from a computer network and comprising at least one of: climate, external wind speed, outdoor temperature, precipitation, humidity, roadway surface conditions, and ambient pressure.

Also in accordance with another example implementation, the control commands include at least one of: a steering torque or angle setting, a brake pressure setting, or an accelerator setting, and wherein the output parameter measurement data include at least one of: a turning angle of a wheel, a measure of deceleration, a vehicle speed, or a measure of acceleration.

In another example implementation, a vehicle includes one or more controllers including: memory; processor circuitry forming one or more processors communicatively coupled to the memory; and a driving assistance unit being operated by the one or more processors. The processor is to operate by generating input condition data used to generate an automatic control command at the vehicle to control the vehicle, generating output parameter measurement data resulting from use of the automatic control command, generating performance measurement data depending at least in part on differences between the actual output parameter measurement data and expected output parameter measurement data of the automatic control command, and transmitting the performance measurement data, the input condition data, and the actual output parameter measurement data to a fleet data adaptation computing device receiving transmissions from a plurality of remote vehicles in a fleet and placing data of the performance measurements, input conditions, and actual output parameter measurements into a fleet database. The processor also operates by receiving, over-the-air (OTA), a calibration correction from the fleet data adaptation computing device, wherein the fleet data adaptation computing device generates the calibration correction by determining whether a performance measurement in the fleet database is deemed inadequate, determining an updated calibration control command-to-input conditions correlation using the data of the fleet database, and generating the calibration correction based on the correlation, and replacing or modifying a previous inadequate control command value at the vehicle by using the calibration correction.

Also in accordance with another example implementation, the performance measurement data is deemed inadequate when it is determined that an error is sufficiently large to impact safety or causes a reduction in vehicle user experience quality.

Also in accordance with another example implementation, the receiving of the calibration correction is part of a broadcast of the calibration correction to multiple vehicles in the fleet.

Also in accordance with another example implementation, the receiving of the calibration correction comprises receiving multiple calibration corrections of multiple different types of control commands.

Also in accordance with another example implementation, the performance measurements, state, and environment of the vehicle and the calibration correction is transmitted with 10-20 Gbps over a 5G network.

Also in accordance with another example implementation, transmissions of the input conditions of the vehicle and the calibration corrections are encrypted.

BRIEF DESCRIPTION OF THE DRAWINGS

The present disclosure will hereinafter be described in conjunction with the following figures. The figures are not to scale and numerals in the figures denote like elements, and wherein.

DETAILED DESCRIPTION

The following detailed description merely presents example implementations and is not intended to limit the disclosure or the application and uses thereof. Furthermore, no intention exists to be bound by any theory presented in the preceding background or the following detailed description.

Driver assistance systems perform adaptive self-learning strategies where a vehicle's sensors are used to take real-time measurements to determine a vehicle state including motion of a vehicle when the driver assistance system is performing an action to control the motion of the vehicle. The strategies are used to learn in-vehicle uncertainties and adjust sub-optimal (or inadequate) driver assistance settings to enhance the controls and customer's experience.

It has been found, however, that the disclosed methods herein increase the performance of the driver assistance systems when fleet data of multiple vehicles is factored to calibrate on-vehicle-based driver assistance control actions or commands. Thus, by one form, the present disclosure relates generally to fleet data collected from a fleet of connected vehicles and over a wireless communications network, characterizing the collected fleet data for individual specific control types or functions, such as steering control for one example, using the characterizations to generate calibration values or signals for specific functions on a specific type of vehicle (e.g., make (e.g., manufacturer), model, and year of manufacture) or even a specific individual vehicle. The calibration values are then transmitted to individual or multiple vehicles in the fleet. In other words, the present method and system uses over-the-air (OTA) networks to transmit adjustments of correlation between driver assistance control command values and input condition data to update software or firmware of the driver assistance system on the individual vehicles. The reduction in calibration errors has been found to be significant, such as 67% reduction in error for autonomous steering control in an example described below. Herein, the terms correlation and correspondence are meant in a general sense to refer to elements in a cause and effect relationship, and not meant or limited to a strict mathematical relationship or algorithm.

Figure 1:
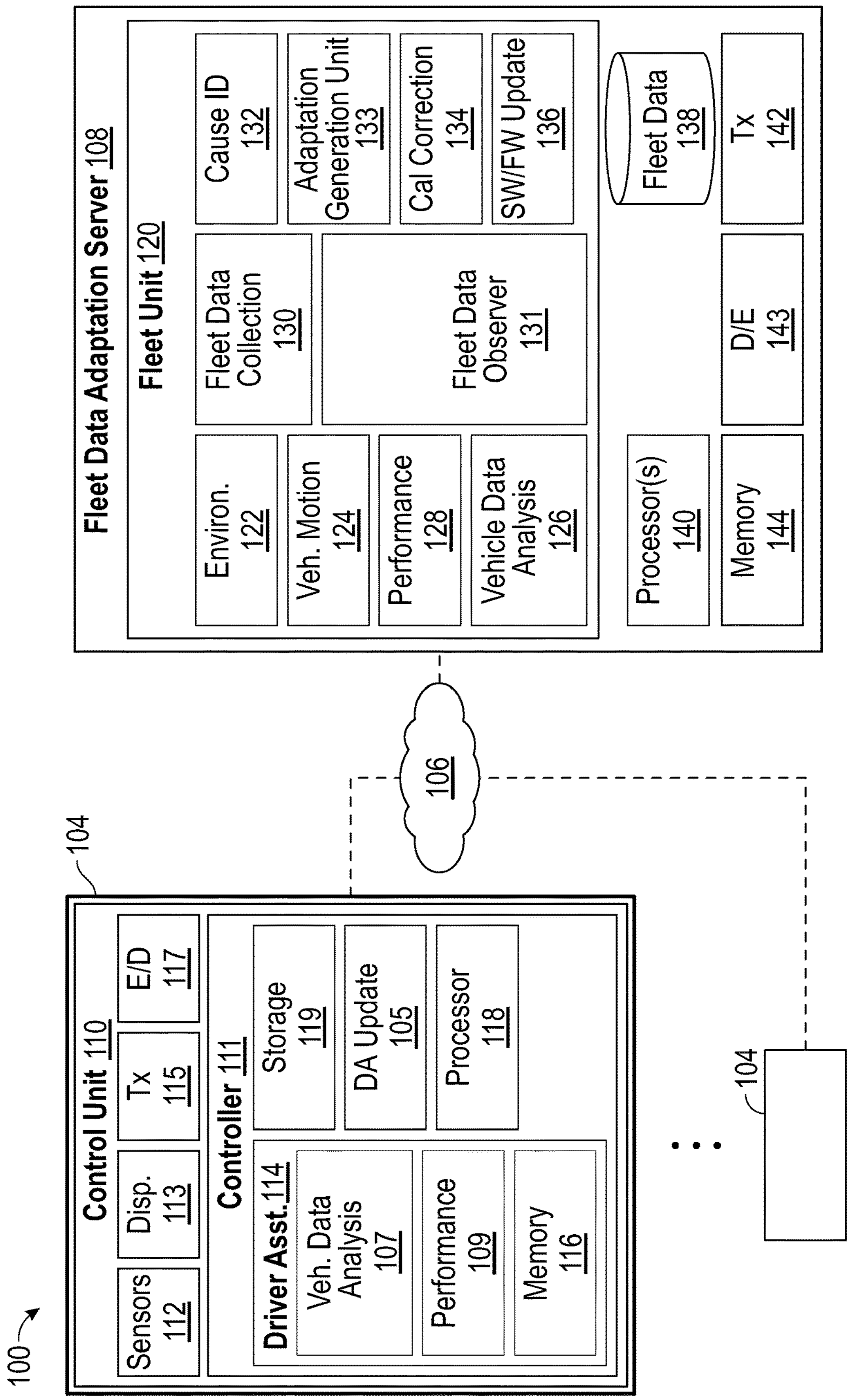
FIG. 1 is a schematic diagram of an example driver assistance communications network for a fleet of vehicles according to at least one of the implementations herein.

Referring to FIG. 1, a system 100 for collecting and using fleet data from a fleet 102 of vehicles 104 is in accordance with various implementations herein. In addition to the fleet 102, the system 100 includes a fleet data adaptation server or computing device (or just fleet server) 108, that may be or have one or more fleet servers that communicate remotely with one or more of the vehicles 104 through a communications network 106. In various implementations, the system 100 generates fleet data, including data related to braking, steering, and/or drive to name a few examples, but may be for any control or system on the vehicle that uses input conditions such as a state of the vehicle or an environment around the vehicle to set or indicate control commands. The fleet data may be communicated to the fleet data adaptation server 108 to analyze and characterize the fleet data. A calibration is performed at the fleet server 108 that uses the fleet data to generate control command corrections (or calibration values) to adjust or replace previous control commands or control command values that were mainly based on on-vehicle measurements without the use of the fleet data or have become outdated. The calibration values represent correlations between input conditions and control commands that reduce performance measurements or errors, and the calibration values may be control command values or modifiers used to adjust control command values. It will be understood that this also may include adapting new control commands not used before when fleet data indicates new correlations can be used. The fleet server then transmits the calibration values back to the vehicles 104 to update the driver assistance programs at the vehicles 104. The details for the operation of system 100 are described with process 300 of FIG. 3, while the sub-processes and implementations thereof are described with any of in FIGS. 4-12, in accordance with the example implementations herein.

Figure 3:
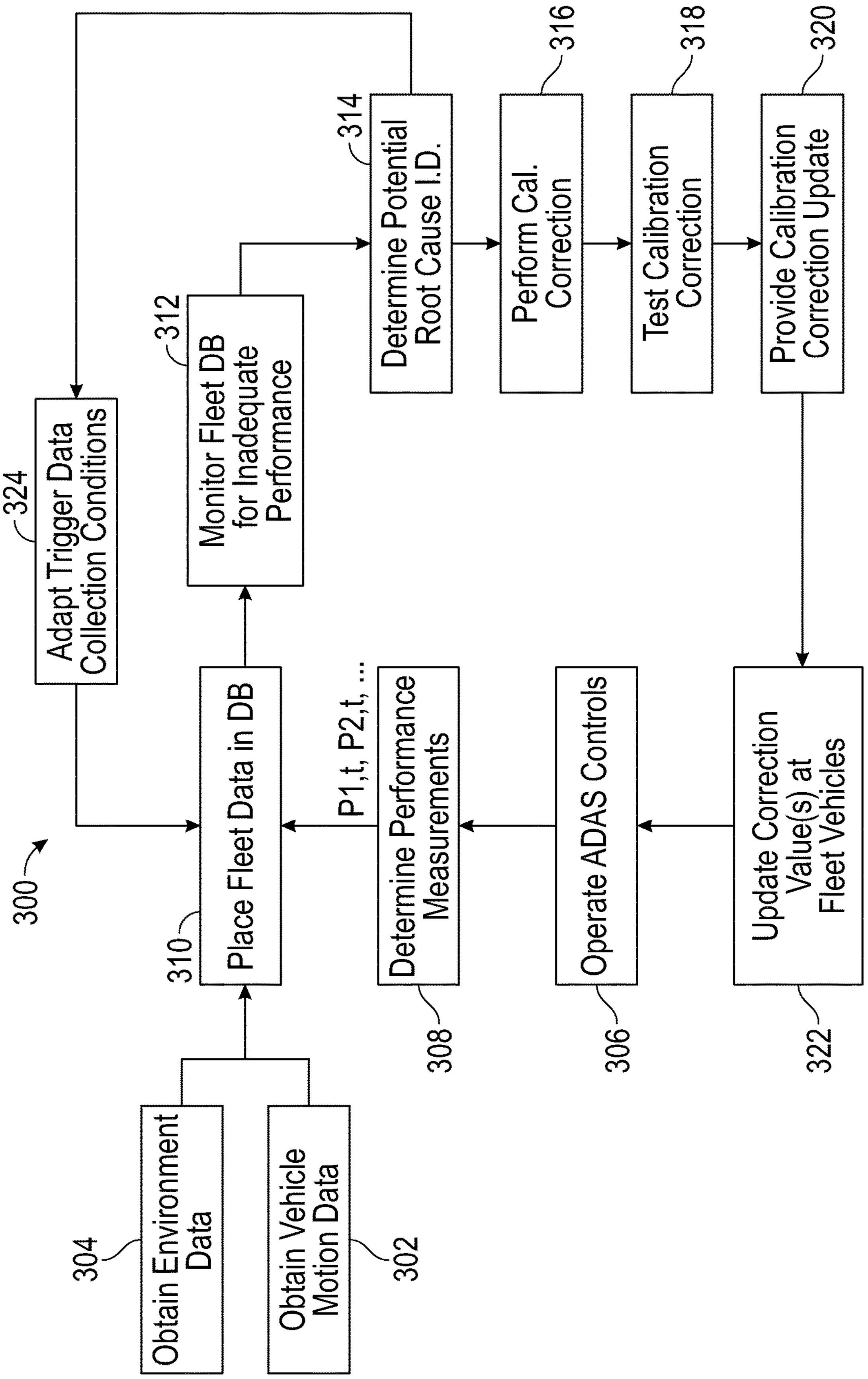
FIG. 3 is a flow chart of an example process adapting fleet data for a driver assistance system according to at least one of the implementations herein.

Returning to FIG. 1, and in various implementations, the vehicle 104 represents one of several different vehicles 104 that operate on roads or other paths (collectively referred to as "roadways" herein). The system 100 may include any number of vehicles 104 that, working together and with the remote fleet server 108 collectively perform the process 300 that is depicted in FIG. 3. In addition, while the singular term "vehicle" may be used at times, it will be appreciated that this refers to any number of different vehicles (e.g., in a fleet or otherwise used together in the system 100) unless context indicates otherwise.

By one form, each vehicle 104 comprises an automobile, and the vehicle 104 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles. Otherwise, the vehicle 104 also may comprise a motorcycle or other vehicle, such as aircraft, spacecraft, watercraft, and so on, and/or one or more other types of mobile platforms (e.g., a robot and/or other mobile platform).

In some approaches, some of the vehicles 104 (in the fleet 102) may be operated in whole or in part by a human driver, whereas other of the vehicles 104 may comprise an autonomous or semi-autonomous vehicle, for example in which vehicle control (including acceleration, deceleration, braking, and/or steering) is automatically planned and executed by a control unit 110, in whole or in part. In addition, certain vehicles 104 may be operated by a human at certain times and via automated control at other times. Also, some of the vehicles 104 include automatic functionality via computer models that are trained using the data that is generated and processed via the system 100.

Many physical components and various details of the mechanical and electrical systems on the vehicle 104 are omitted to avoid obscuring the description of the disclosed fleet data adaptation methods and systems herein. Relevant here, the individual vehicles 104 each may have a control unit 110 that has a sensor unit or array 112, a controller or computer system 111, a display 113 to provide information to a driver or passengers, and a transceiver 115 to communicate with the remote fleet adaptation server 108 (also referred to herein as just the fleet unit or fleet server 108) or other remote computers or servers. The control unit 110 also has an encryption/decryption (E/D) unit 117 to encrypt outgoing data being transmitted by transceiver 115 and decrypt incoming data received by the transceiver 115 to guard the privacy of the users of the vehicles.

In one example form, the control unit 110 also either facilitates or performs the generation and processing of sensor data by using the sensors or sensor array 112 and for the vehicle 104 or another vehicle. In addition, the control unit 110 is coupled to a braking system, a steering system, and/or a drive (or throttle or accelerator) system, and when the vehicle 104 is an autonomous or semi-autonomous vehicle, the control unit 110 also can provide control over automated features of the vehicle 104 including automated operation of the braking system, the steering system, and/or the drive system.

In one example form, the sensor array 112 obtains sensor data for generating input condition data to be used to set control commands and to transmit to the fleet server 108. The example sensor array 112 includes one or more cameras (such as video cameras and/or in certain implementations still image camera), and may include one or more other detection sensors, such as radar, sonar, LIDAR, or the like, and/or other types of sensors, such as vehicle position sensors, speed sensors, accelerometers, gyroscopes, inertial measurement units (IMUs), braking sensors, steering sensors, and so on. The sensor array 112 is used to capture the state, position, and orientation of the vehicle 104 as well as detect, identify, and/or track objects near the vehicle 104. Other vehicle location data may be obtained from wireless communications or computer networks, such as by GPS and other navigation applications. Such location data may include map data that may be indicative of roadways, traffic data, weather conditions, construction information, and the like.

The controller 111 of the control unit 110 has one or more driver assistant (or assistance) (DA) programs or units 114, a driver assistant (DA) update unit 105 to update the driver assistant unit 114, memory 116, a storage device 119, and processor circuitry forming one or more processors 118 that operate the driver assistant unit 114. The driver assistant unit 114 may or may not be stored on memory 116. The control unit 110 or controller 111 also may include an interface and a computer bus (not shown). In one example, the controller (or computer system) 111 obtains sensor data from the sensor array 112 and/or other data from the transceiver 115. In various examples, the controller 111 processes the sensor or other data to develop, train, and/or implement one or more autonomous driving models for the vehicle 104 (e.g., for automated control of the braking system, steering system, drive system, and/or one or more other related features such as cruise control, blind spot or pedestrian detection, and so on).

The control unit 110, and in turn the controller 111 are disposed on the vehicle 104. In other forms, the control unit 110, controller 111, and/or one or more components thereof may be disposed externally to the vehicle 104, for example on other network locations such as cloud or other remote servers, where sensor data processing, including image processing, is performed remotely. In other examples, the controller 111 also performs functions in concert with the remote fleet data adaptation system or server 108, described further below. It will be appreciated that the controller 111 may otherwise differ from the implementation depicted in FIG. 1. For example, the controller 111 may be coupled to or may otherwise use one or more remote computer systems and/or other control systems, for example as part of one or more of the above-identified vehicle 104 devices and systems.

The processor 118 performs the computation and control functions of the controller 111, and may comprise any type of processor circuitry forming one or more processors, processor cores, single integrated circuits such as a microprocessor, processors on systems on a chip (SoC), or any suitable number of integrated circuit devices, processor circuitry, and/or circuit boards working in cooperation to accomplish the functions of a processing unit. During operation, the processor 118 executes one or more of the driver assistant programs 114 and, as such, controls the general functions of the controller 111 as well as executes the processes at the vehicle described herein, such as portions of the processes and implementations depicted in FIGS. 2-12 and as described further below in connection therewith.

The driver assistant (DA) unit or program 114 may be an advanced driver assistance system (ADAS) and may include autonomous driver (AD) functions that include any of the functions or automation levels from merely providing a driver information or estimates with full driver control to fully autonomous driving with unmanned vehicles or no driver control. In the example implementations herein, an autonomous steering system is used to explain the methods and driver assistance systems using fleet data. In this example and relevant here, the driver assistance (DA) unit 114 has a vehicle data analysis unit 107 that analyzes sensor data to generate input conditions, and generates control commands based on the input conditions to perform control of the vehicle systems mentioned above. Also, in this example, a performance unit 109 compares raw measurements, also referred to as actual output parameter measurements, resulting from the use of control commands by the DA unit 114, and compared to estimated or expected output parameters that should have resulted from the use of the control commands, thereby resulting in a performance measure or error to rate the performance of the DA unit 114.

The DA update unit 105 receives calibration correction updates from the remote fleet data adaptation computing device or server 108. The DA update unit 105 then updates control commands or control command correlations to input conditions, also as described in detail below. Such correlations and/or control command values may be stored in memory 116 or storage 119.

The memory 116 can be any type of suitable memory. For example, the memory 116 may include various types of dynamic random access memory (DRAM) such as SDRAM, the various types of static RAM (SRAM), and the various types of non-volatile memory (PROM, EPROM, and flash). In certain examples, the memory 116 is located on and/or co-located on the same computer chip as the processor 118. In the depicted implementation, the memory 116 stores the above-referenced DA program 114. The memory 116 also may include one or more databases to store data related to driver assistance functions described herein and other stored values including input condition data, control command data, output parameter measurement data, and/or performance measurement data, as well as corresponding system control settings, and so forth and as explained with implementations depicted in FIGS. 2-12 and as described further below.

The components of the controller 111 may have one or more buses (not shown) to transmit programs, data, status and other information or signals between the various components of the controller 111. The bus can be any suitable physical or logical connection among computer systems and components. This includes, but is not limited to, direct hard-wired connections, fiber optics, infrared and wireless bus technologies. During operation, the DA unit 114 is stored in the memory 116 and executed by the processor 118.

An interface (not shown) may provide communication to and from the controller 111, for example from a system driver and/or another computer system, and can be implemented using any suitable method and apparatus. In one form, the interface obtains various data from the sensor array 112 and/or a navigation system. The interface can include one or more network interfaces to communicate with other systems, components, technicians, and/or one or more storage interfaces to connect to storage apparatuses, such as the storage device 119.

The storage device 119 can be any suitable type of storage apparatus, including various types of direct access storage and/or other memory devices. In one example implementation, the storage device 119 comprises a program product from which memory 116 can receive a program 114 that executes one or more implementations of the processes and implementations of FIG. 3 and as described further below in connection therewith. In another example implementation, the DA unit (or program product) 114 may be directly stored in and/or otherwise accessed by the memory 116 and/or a secondary storage device such as a disk.

It will be appreciated that while this example implementation is described in the context of a fully functioning computer system, the mechanisms of the present disclosure are capable of being distributed as a program product with one or more types of non-transitory computer-readable signal bearing media used to store the program and the instructions thereof and carry out the distribution thereof, such as a non-transitory computer readable medium bearing at least the DA program 114 and DA update unit 105, and including computer instructions stored therein for causing a computer processor (such as the processor 118) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain implementations. It will similarly be appreciated that the computer system of the controller 111 also may otherwise differ from the implementation depicted in FIG. 1, for example in that the computer system of the controller 111 may be coupled to or may otherwise use one or more remote computer systems and/or other control systems.

With continued reference to FIG. 1, and in various implementations, the vehicle 104 and the remote fleet server 108 communicate via one or more communications networks 106. In various implementations, the communications networks 106 may include one or more computer networks such as the Internet, and communications networks (e.g., satellite-based, cellular, and/or any number of other different types of wireless communications networks). By one example form, the transmitted data mentioned herein, such as performance measurements, input conditions, control commands, and output parameter measurements of the vehicle, and the calibration correction are transmitted using data bandwidth up to 10-20 Gbps over a 5G network. By one form, the calibration corrections are transmitted back to the vehicles using over-the-air (OTA) broadcasts.

Also in various implementations, the remote fleet server or computing device 108 is disposed remote from at least one but otherwise each of the vehicles 104 (e.g., in the fleet 102). By one form, the components (units or modules) of the fleet server 108 are all in one physical location, but in other alternatives, any one or more of the components may be remote from each other at separate network locations. In some examples, the fleet server 108 includes one or more fleet units 120 to perform the driver assistance operations described below. Specifically in one example form, the fleet unit 120 here has an environment unit 122 and a vehicle motion unit 124 to collect data of the input conditions sensed or otherwise determined at the vehicle, a vehicle data analysis unit 126 that receives other input conditions, the control commands performed in response to the input conditions, actual output parameters and optionally expected output parameters if not already on the fleet server in a fleet database (labeled fleet data) 138 or other storage or memory. A performance unit 128 either receives performance measurements (or errors) from the vehicle or computes the performance measurements using the data from the vehicle data analysis unit 126. The data obtained by the input condition units 122 and 124, the vehicle data analysis unit 126, and the performance unit 128 are provided to a fleet data collection unit 130 that updates the fleet database 138 with the data.

A fleet data observer unit 131 is provided to analyze the data in the fleet database 138 to recognize when a performance measurement is inadequate and should be updated to correct the recognized error. A cause identification (ID) unit 132 determines or receives which parameters have an error that is being corrected, while a calibration (Cal) correction unit 134 then determines updated correlations between input conditions and control commands for an identified parameter and computes calibration corrections or values, which are then tested or validated as explained below. After validation, the fleet unit 120 provides the calibration values to be transmitted to the vehicles as software (SW) and/or firmware (FW) updates by an SW/FW update unit 136. An adaptation generation unit 133 updates the fleet database 138, via the fleet data collection unit 130, to recognize the input conditions and control commands (also referred to as the trigger data) that cause an inadequate performance measure so that already updated calibration data or values can be transmitted to the vehicle when such recognition may occur after the parameters with the errors have been identified and after the correction data (or calibration values) have already been transmitted out to the fleet for example. By another option, data that indicates an updated correlation between input conditions and control commands, as well as the calibration values may be stored on the fleet database as well. The operation of the fleet unit 120 to use fleet data to increase driver assistant performance on vehicles 104 in the fleet 102 is described in detail below with at least process 300 (FIG. 3).

The fleet server 108 also has processor circuitry forming one or more processors 140, transceivers 142, a decryption and/or encryption unit 143, and memory 144. The fleet server also has the fleet database 138 storing driver assistance-related data. In various implementations, the transceiver 142 is used to communicate with the vehicles 104, including with respect to the driver assistance data and the processing thereof, and the data being transmitted may be encrypted and/or decrypted as needed.

Also in certain implementations, the processor 140 has processor circuitry to process, or facilitate processing of, the driver assistance data from the vehicles 104, including input conditions such as vehicle state, motion, environment data, and/or performance values, as well as to handle generation of calibration updates to transmit back from the fleet server 108 to the vehicles 104 as described further below in connection with the processes and implementations of FIGS. 2-12. Otherwise, as depicted in FIG. 1, the D/E unit 143, transceiver 142, processor 140, and memory 144 here which may include a storage device, are similar to the similar features of the vehicles 104 and need not be described again here, other than the operations performed by each unit or component of the fleet server 108 as described below.

Figure 2A:
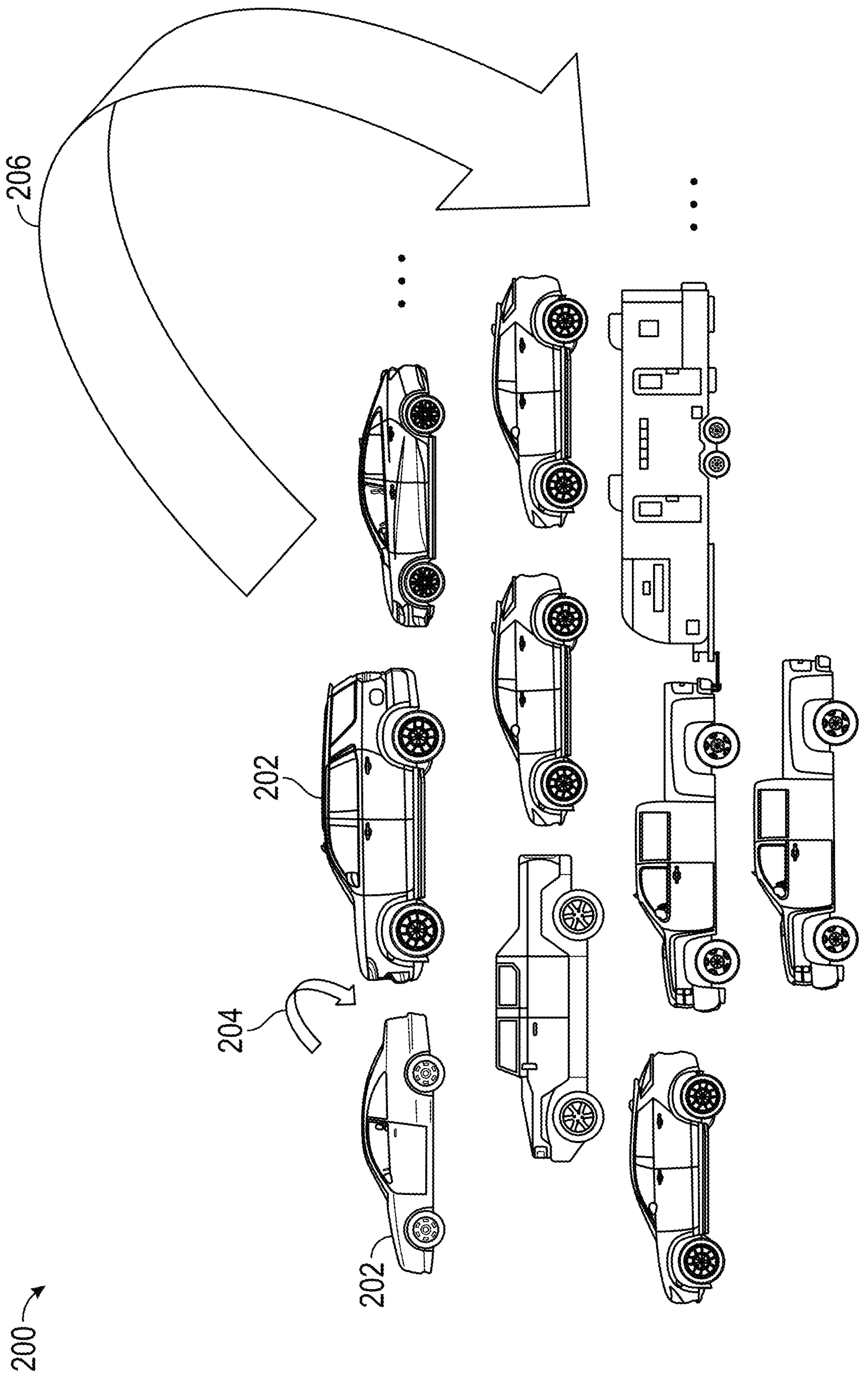
FIG. 2A is a schematic diagram of an example fleet of vehicles according to at least one of the implementations herein.
Figure 2B:
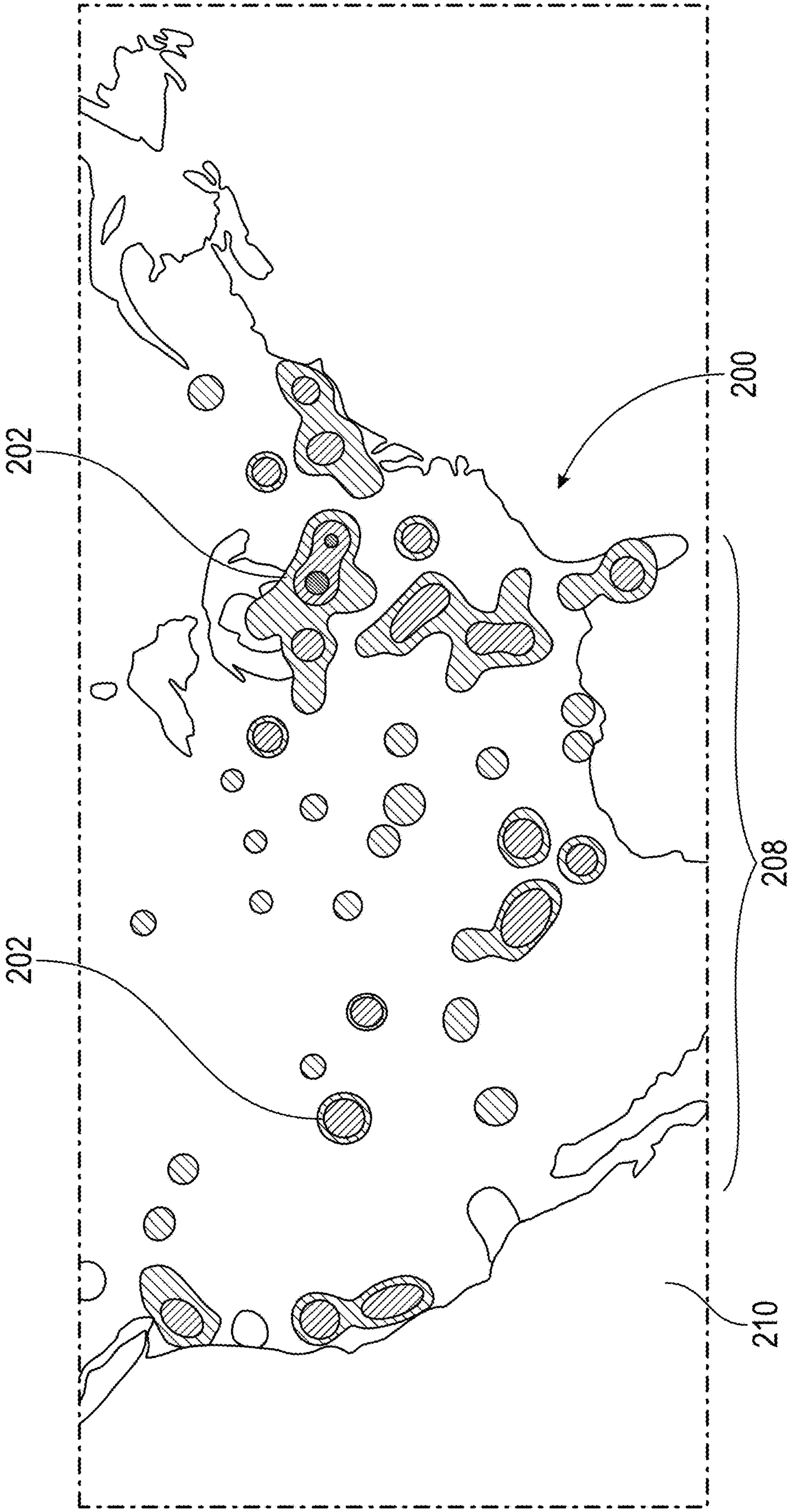
FIG. 2B is a heat map showing example locations of the vehicles in the fleet of FIG. 2A and according to at least one of the implementations herein.

Referring to FIGS. 2A-2B, the difference in calibration operations is visualized with a fleet 200 of vehicles 202. Any one of the vehicles 202 performs a self-calibration 204 by only using on-vehicle measurements and data obtained online (such as climate data) to update correlations between input conditions, control commands, and raw measurements (also referred to as actual output parameters) to be used for the driver assistance system at the vehicle. Instead, fleet-based or fleet level calibration or updating 206 may occur as describe herein to perform fleet data adaptation where fleet data is collected, used to update correlations between input conditions and control commands, and then provide updated corrections or control command values (or calibration values) to multiple or all vehicles 202 in the fleet 200 as described herein. An example heat map 210 (FIG. 2B) shows the geographical concentration of vehicles 202 of fleet 200 across an area 208, here being the United States as one example, where the vehicles across any desired area communicates wirelessly with a fleet server or computing device, such as fleet server 108. The area can be anywhere in the world or any part of the world, or even in space.

Referring to FIG. 3, an example process 300 of fleet-based data adaptation for calibration of driver assistance systems of individual vehicles is provided in accordance with various implementations herein. Process 300 includes operations 302 to 322, generally numbered evenly, and refers to the systems and sub-components thereof from any of FIGS. 1-2B and 4-12, where relevant.

In a first stage of process 300, operations 302 to 310 relate to data collection. A second stage of process 300 relates to performance analysis at operations 312, 314, and 324, while in a third stage, operations 316 and 318 involve generating updated calibration corrections. In a fourth stage, operations 320 and 322 relate to updating the calibration values at the vehicles.

As a preliminary matter, the fleet server 108 may select to either collect data from certain vehicles in the fleet, or analyze data collected from all of the vehicles in the fleet. First, the vehicles may be grouped by vehicle type, such as SUVs or sedans, and vehicle arrangement, such as those pulling a certain type of trailer, having a roof rack carrying objects on a roof of the vehicle, or for trucks, such as pick-up trucks or larger trucks, being loaded with a certain type of cargo. Another category for grouping the vehicles is by make and model (including a particular model year) such that such vehicles are very likely to have the same driver assistance program being used by the vehicle. By one form, the fleet may include all vehicles of a certain model and year made by a particular manufacturer. Yet another grouping is to have the vehicles sub-grouped by the parameter that is being analyzed such as parameters related to steering control, brake pressure, throttle or accelerator pressure, cruise controls, and so forth as desired when the vehicles are known to have the same (or sufficiently similar) system being tested and/or the same driver assistance program while it was found that other variations in the vehicles are not a concern. By one example, the parameter (or type of control command) may be the only classification for inclusion in the vehicles to be analyzed when type, make, and model of vehicle is not a concern. Otherwise, the fleet server may simply select to receive (or is otherwise set to use) data from vehicles that are to receive the calibration updates so that only the vehicles in the group being analyzed are updated. By other example forms, any vehicle in the fleet or group of vehicles receives calibration updates even though a smaller sub-group of vehicles was used to compute the calibration updates. By some forms, many more vehicles in a target group are monitored than needed for a statistical conclusion on the calibration updating. Thus, 3000 vehicles may be in a fleet and are monitored, but only 1500 samples are needed for the calibration update. This is one example, and many variations are contemplated.

In more detail for the first stage, several different types of data are collected to perform the calibration updating. This includes data related to input conditions that describe the state of the vehicle and/or the environment around the vehicle, control commands that were initiated and performed in respond to the input conditions, resulting raw measurement data which may include actual output parameters and optionally expected or estimated output parameters for those parameters that can have expected values already stored for a remote fleet server. Likewise, performance or error measurements are either computed at the vehicles or the fleet server but may be provided from the vehicle to the fleet server whether or not the fleet server performs its own computation of performance measurements.

As described above for vehicle 104, a sensor unit 112 at the vehicle may be used to collect data to establish a state of the vehicle and an environment around the vehicle. The state of the vehicle may include data regarding the current motion of the vehicle including the driver status (holding the steering wheel or not), vehicle speed, vehicle heading (or orientation), current steering torque (or hand wheel angle (HWA)) being applied, the turning angle of the vehicle wheels, curvature and/or bank of the vehicle, the brake pressure, and/or throttle (or accelerator) pressure to name a few examples. The sensors 112 also may detect environmental conditions near the vehicle, such as road surface conditions, temperature, position and identification of objects near the vehicle via camera images, visibility and light conditions. Otherwise, communications through transceiver 115 may be used to collect other data through communications or computer networks to use remote applications such as GPS to determine a vehicle location and general roadway conditions, such as construction and so forth, and/or weather networks to determine climate, external wind speed, outdoor temperature, precipitation, humidity, roadway surface conditions (dry, wet, icy, and so forth), and ambient pressure. The generated input condition data then may be stored in memory 116 on the vehicle.

The process 300 includes an "operate ADAS controls" 306, which refers to the operation of many different driver assistant (DA) programs and is not limited to a particular level of automation. Here in this example, the driver assistance (or assistant) unit 114 has the vehicle data analysis unit use the input condition data to generate an appropriate control command. Thus, for steering for example, the vehicle data analysis unit 107 has predetermined correlations or generates correlations between one or a set of input conditions, and a corresponding control command that should be applied to achieve an estimated or expected output parameter (or raw measurement). For example, upon generating a set of input condition data, the vehicle data analysis unit 107 may determine a steering torque should be applied to achieve an HWA of five degrees. In this example form, say the vehicle data analysis unit 107 determines the expected raw measurement to be a 10 degree rotation of the front wheels of the vehicle as a result of the HWA. As mentioned below, such expected raw measurement may be computed by the DA unit 114 individually, or the expected raw measurement may be predetermined in a correlation between input conditions, control command, and expected output parameter for a particular parameter and either generated by the vehicle itself or obtained from an external communications or computer network. Such correlation may be determined by the fleet server 108 or another remote server.

The raw measurements or output parameter data may be any vehicle parameter that can be correlated to (or correspond to), or more precisely be the result from application of, a control command value under a set of specific input conditions and for a specific vehicle parameter, such as turning or hand wheel angle (HWA) or steering wheel torque. It will be understood that many different parameters can be raw measurements or output parameters, and these same parameters also can be input conditions for other parameters. It should also be understood that the calibration correction updates herein correct a correlation (or correspondence) between input conditions and control commands in addition to the correlation between the control commands and raw measurement (or output parameters). The terms correlation and correspondence as used herein are related to the relationship between the input conditions and control commands, and the control commands and the output parameters, and indirectly between the input conditions and output parameters, and these terms refer to cause and effect relationships. Thus, the calibration update can adjust the relationship between any pair of these elements (input conditions, control command, and output parameter) or any combination of pairs of these elements depending on the type of parameter being calibrated.

Process 300 is mainly provided from the perspective of the fleet server, and the fleet server is arranged to receive the input condition data of a plurality of remote vehicles in a fleet and that was used to generate automatic control commands at the vehicles to control the vehicles. The transmission of the input condition data via transceiver 115 at the vehicle may be encrypted in this example by E/D unit 117, and by known encryption algorithms such as advanced encryption standard (AES), transport layer security (TLS), and so forth.

Thus, process 300 may include "obtain vehicle motion data" 302, and "obtain environment data" 304, and to receive transmitted input condition data as described above from the vehicle and to input condition units at the fleet server 108, such as an environment unit 122 and a vehicle state or vehicle motion unit 124, for example. It should be noted that the environment data received from wireless networks external to the vehicle first may be received at the vehicle for use to generate control commands, and then re-transmitted to the environment unit 122 at the fleet server. Otherwise, such external environment data could be transmitted to the fleet server directly when desired. Each type of input condition may have its own unit at the fleet sever 108 to convert the data format into a data expected at the fleet database 138 and for calibration computations. The format of the wireless transmission is not particularly limited if the wireless network being used has the bandwidth to reliably transmit a large amount of data, such as over a 5G network at 10-20 Gbps.

The first stage of the process 300 also may include receiving the other data types at the fleet server. Thus, process 300 may include "determine performance measurements" 308, and at the vehicle for example, the performance unit 109 may compare the actual and expected output parameters (or raw and estimated measurements) to determine a performance or error measurement. Alternatively, the vehicle can transmit the input conditions, and then either the actual output parameters alone or with expected output parameters so that the vehicle data analysis unit 126 at the fleet server 108 receives the data, formats the data if not already in a format handled by the fleet server, and then a performance unit 128 at the fleet server compares the actual and expected output parameters and computes a performance measurement or error. In the example above where the HWA was 5 degrees and the expected angle was 10 degrees, say an actual output parameter measurement of the turning of the front wheels was 13 degrees so that the performance measurement or error is 3 degrees.

Figure 4:
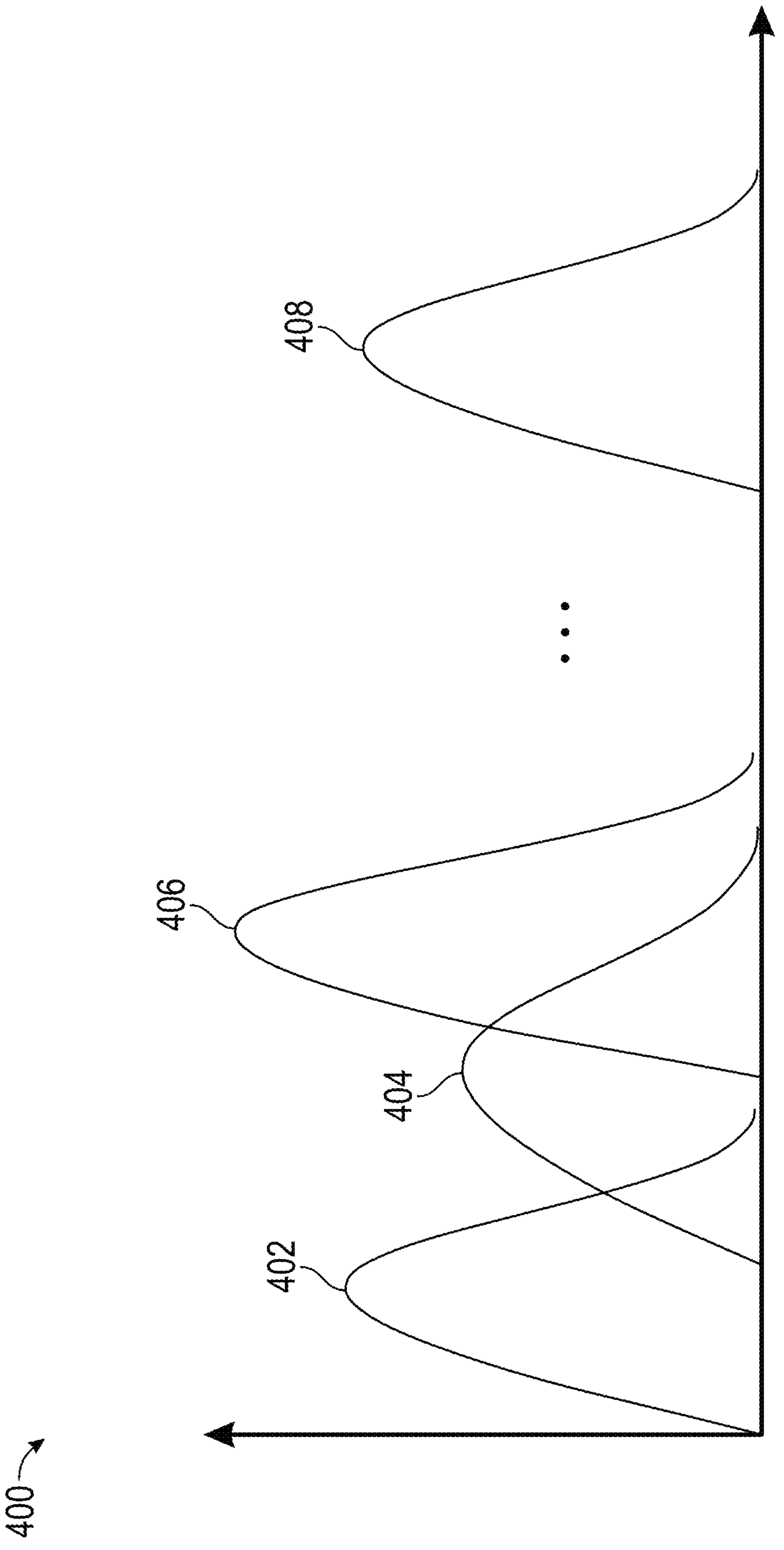
FIG. 4 is a graph showing performance measurements from multiple vehicles in a fleet according to at least one of the implementations herein.

Referring to FIG. 4 for one example, a graph 400 shows a collection of performance measurement data, where 1 to n refers to a vehicle number or identification of the vehicle within a fleet or group of vehicles within the fleet being monitored. The horizontal axis is time and the vertical access is HWA error, which may be measured in degrees difference. The performance errors are designated 402, 404, and 406 for vehicles 1-3 and to performance error 408 for a vehicle n. The performance measurements themselves are designated Pr, where k a time instance or order of calibration updates through time, and v stands for vehicle, and n is as defined above. Graph 400 shows that each vehicle may have different reactions to the same or similar input conditions, here for steering in this example.

As to the timing of the transmission of the calibration data from a vehicle, the timing of the transmissions can vary depending on the goals of the calibration updating. For example, while the data of the input conditions may be generated by a vehicle in real-time or near real-time to quickly select and perform control commands on the vehicle, the calibration updating does not necessarily need to be that fast. Much of the calibration updating is expected to take much longer, where calibration precision by using fleet data is the higher priority and many of the parameters receiving updated calibration first will be tested on test vehicles before releasing the calibration updates to consumers' vehicles. Thus, the timing for a single calibration may be measured in hours or days, rather than seconds or less. The timing may be even longer when the system will wait for a certain amount of data from a minimum number of vehicles in the fleet for a particular parameter (such as steering in a certain situation).

By one form, the data collection is activated when certain conditions are met at the vehicle, such as when all desired data has been generated for a specific parameter or event that is being monitored. Once that happens, the calibration data included in a single event that includes the input conditions, the command controls, the raw measurements (output parameters), and when provided from the vehicle, performance measurements for that parameter, are uploaded from the vehicle until all of the desired data is obtained at the fleet server for that event. By one form, the data of many multiple events within a certain duration may be obtained such as 5-10 seconds of data being sampled 10 per second for example. Each event has the input conditions that correlate to a control command and that has expected or estimated output parameters as well as resulting actual output parameters.

Process 300 may include "place fleet data in DB" 310, and this may be performed by the fleet data collection unit 130 to place the data in a fleet database 138. This includes placing the performance measurement data, the input condition data, and the output parameter measurement data into one or more fleet databases.

Table 1 below is one example representation of a fleet database, such as fleet database 138. In a first section of Table 1 labeled Events, individual rows hold data of a control command event whether that event is to control the motion of the vehicle or to perform another task, such as displaying information to a user or computing an estimate measurement of a desired parameter. The collected data is then organized into columns as shown and that is collected for a single event for a particular group of vehicles, such as the vehicle class (make, model, and/or year) and specific vehicle identification, input conditions, the control command that was used in response to those conditions, a resulting actual output parameter, an expected output parameter that was compared to the actual output parameter, and a performance measure that is the comparison value or error between the actual and expected output parameters.

With regard to the vehicle class and ID, and by one example form, a single fleet database is used that lists the data of all vehicle makes and models (including year manufactured), and the calibration units select the data of just those vehicles with a certain make and model to perform analysis of the data. By other forms, a separate fleet database may assigned to a single vehicle class and model, or even for a specific vehicle, where data from separate databases are selected, collected, and compared. This may include vehicles with hitched trailers of any kind or specific kinds, or other arrangements, such as filled roof racks carrying various objects, such as hard or soft luggage carriers, canoes, kayaks, bicycles, and so forth. This also may include cargo areas or beds of a vehicle, such as various trucks filled with various cargo objects or materials.

The input conditions may include many different characteristics whether indicating a state of the vehicle (including motion of the vehicle) and the environment around the vehicle as already described above. The examples in Table 1 below show a state of the vehicle including vehicle velocity and heading as well as steering wheel angle (or hand wheel angle), while environment-related conditions around the vehicle include temperature and wind. Many more and/or alternative input conditions may be included than that shown.

TABLE 1

| Fleet Database FLEET DATABASE | | | | | | | | | | | |
|---|---|---|---|---|---|---|---|---|---|---|---|
| Events | | | | | | | | | | | |
| Veh Cls | Veh. ID | Input Conditions | | | | | Control Command | Actual Output Par. | Expect Output Par. | Perform. Measure | Cause ID |
| | | Vel | Hdg | Str Ang | Temp | Wind | | | | | |
| Triggers | | | | | | | Control Command | Actual Output Par. | Expect Output Par. | Perform. Measure | Cause ID |
| | | | | | | | | | | | |

The control command columns and the columns for raw measurements and output parameters have values as described above and for a particular event with a combination of input conditions.

A second section in Table 1 labeled Triggers may be reserved for trigger data collection conditions to recognize when a performance measure shows inadequate (or sub-optimal) performance as explained herein. It will be appreciated that Table 1 is one example representation of the fleet database, and the fleet database may have many different field arrangements. Thus, alternative arrangements may include a first-in, first-out (FIFO) assignment to fields in the database, where tags, labels, and so forth are assigned to data values and may be field addresses with a look-up index of the tags or labels rather than use of columns and rows for assigning data classifications as shown. Many variations are contemplated.

Process 300 may include "monitor fleet DB for inadequate performance" 312, where the fleet data observer unit 131 monitors the fleet data in fleet database 138 to find observer vehicle related issues. This refers to determining whether one or more performance measurements in the fleet database are deemed inadequate. In one example, when any performance measurement or error is too large and is deemed inadequate or sub-optimal, the correlation between input conditions and control commands, and in turn output parameters, should be adjusted.

The performance measure may be deemed inadequate by comparing the performance measure to a threshold determined by experimentation for specific events and specific vehicle parameters being monitored. The threshold may be set where it is determined that an error is sufficiently large such that it indicates it will impact safety or causes a reduction in vehicle user experience quality.

Process 300 may include "determine potential root cause I.D." 314, and where the inadequate parameters are already identified by the observer unit 131. Thus, the cause ID unit 132 simply places a cause identifier in the fleet database 138, thereby indicating which parameter, and in turn which control command, should be updated.

Process 300 may include "perform calibration correction" 316, and this may be performed by calibration correction unit 134 (FIG. 1). Thus, once performance measurements are deemed inadequate for an event, a preliminary operation may include detecting a pattern between the input conditions and errors observed to determine if there is a relationship that can aid in the calibration updating. This includes observing a distribution of the errors relative to input conditions.

Figure 6:
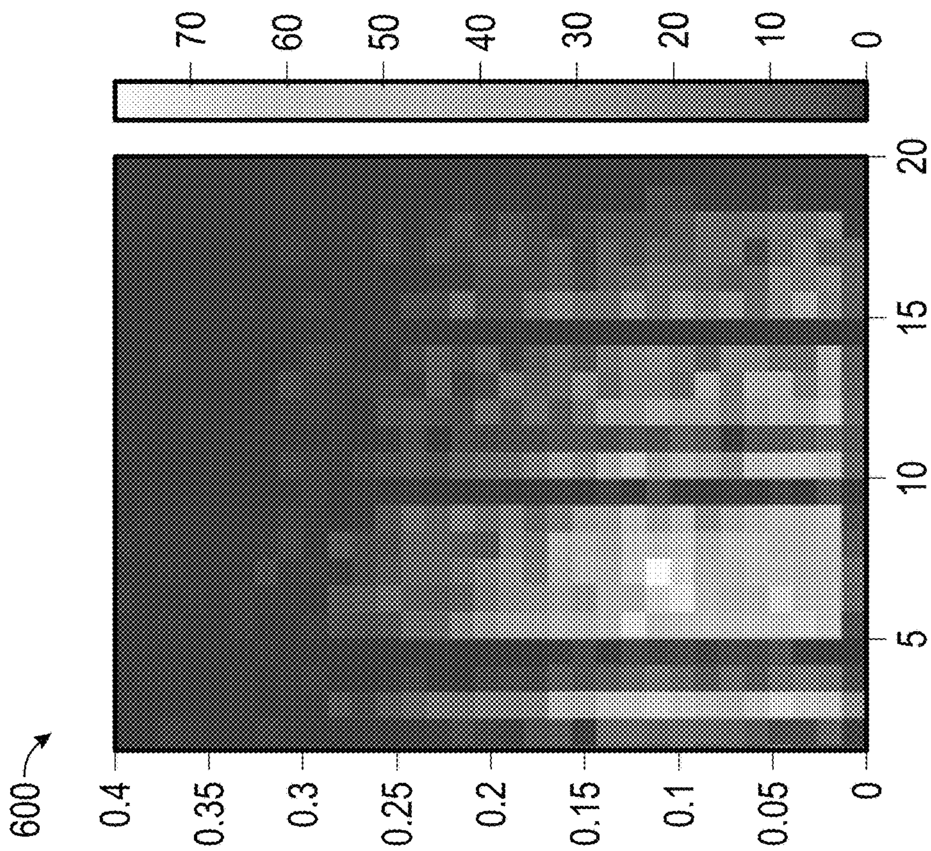
FIG. 6 is a graph showing a spectral distribution of hand wheel angle errors depending on wind for a fleet of vehicles according to at least one of the implementations herein.
Figure 5:
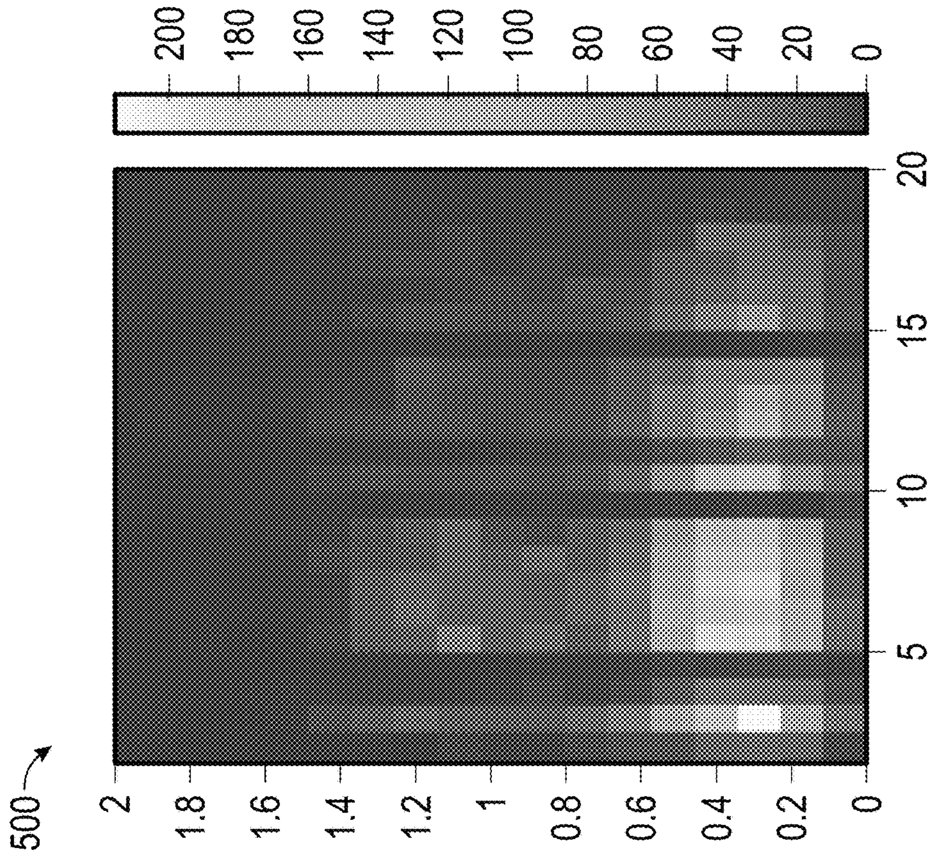
FIG. 5 is a graph showing a spectral distribution of lateral offsets to a desired path depending on wind for a fleet of vehicles according to at least one of the implementations herein.

Referring to FIGS. 5-6 for example patterns or correlations (or non-correlations) with the performance measurements, spectral graph 500 shows an impact of wind on steering control and trajectory control performance measurements or errors from fleet data from more than 1500 vehicles. The vertical axis is lateral offset to the desired path (in meters) and from a center of a roadway versus wind speed on the horizontal axis, while the lighter the greyscale shade, the more vehicles had the same error value (the denser the error count). It will be noted that other performance measurements and input conditions could be graphed instead. The graph 500 shows a concentration of errors between winds of 5-10 mph and a lateral offset error of about 0.3 meters. It does not show a clear correlation where the higher the wind, the greater the error. Depending on other circumstances surrounding this particular event (with particular input conditions), the error may be deemed inadequate, and the control command value should be adjusted to reduce the 0.3 meters at these wind levels.

Likewise, a graph 600 shows performance measurements, here by example being a hand wheel angle (HWA) error in degrees difference on the vertical axis versus wind speed on the horizontal axis, and while the lighter the greyscale shade, the denser the vehicle count for an error value. Here too, and consistent with graph 500, a concentration of errors occurs at 5-10 mph when the HWA error is about 0.1 degrees, such that no clear correlation is revealed, and the errors should be reduced if they are found inadequate.

Figure 7:
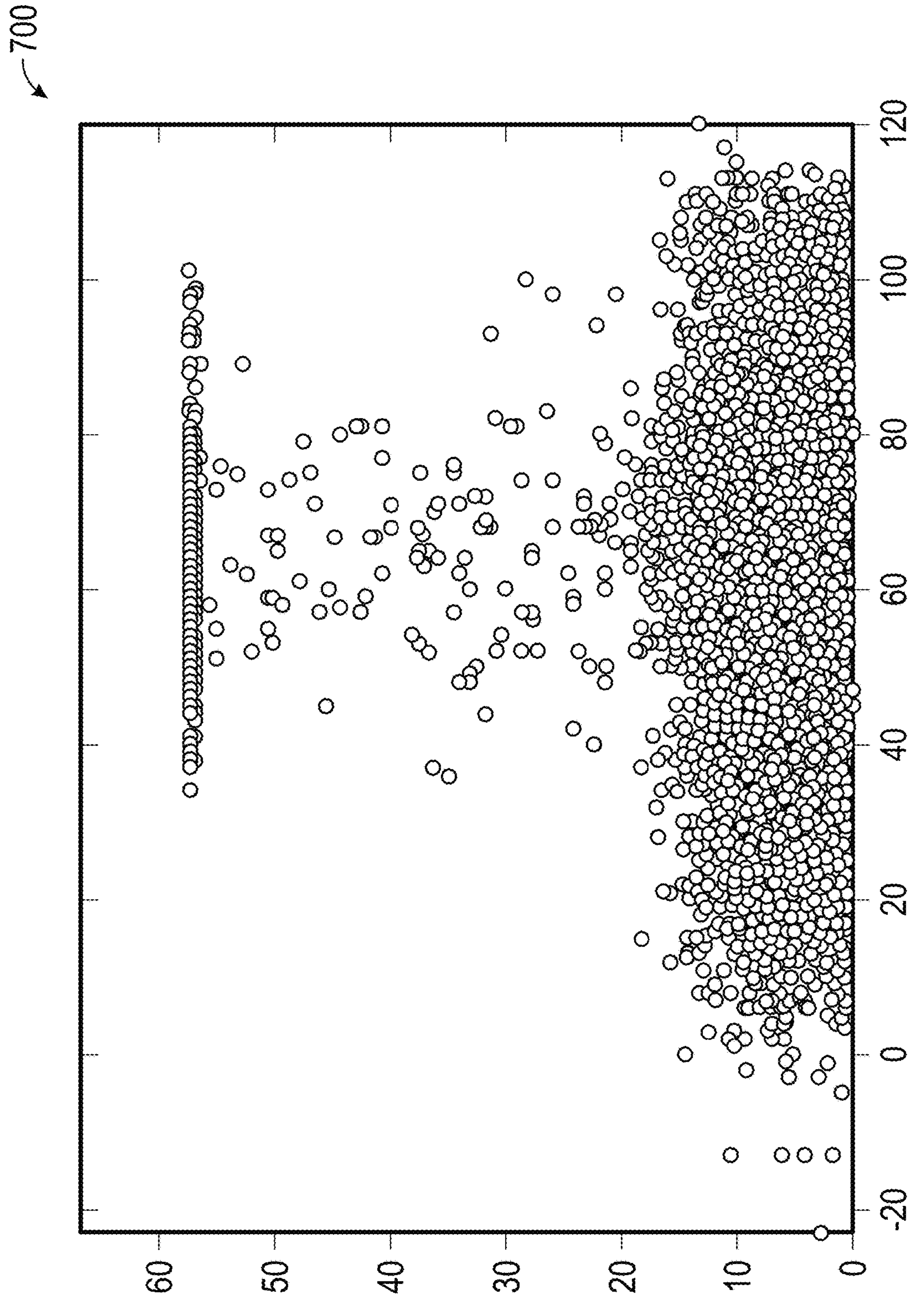
FIG. 7 is a graph showing hand wheel angle errors depending on temperature for a fleet of vehicles according to at least one of the implementations herein.
Figure 8:
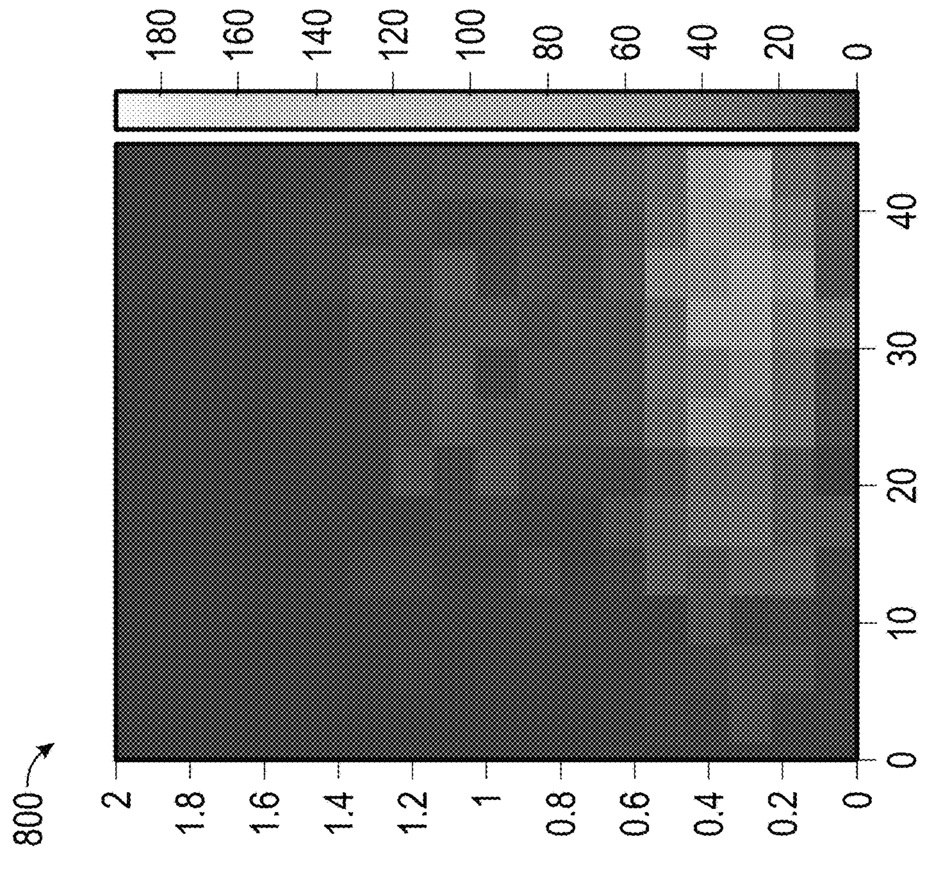
FIG. 8 is a graph showing a spectral distribution of lateral offsets to a desired path depending on temperature for a fleet of vehicles according to at least one of the implementations herein.
Figure 9:
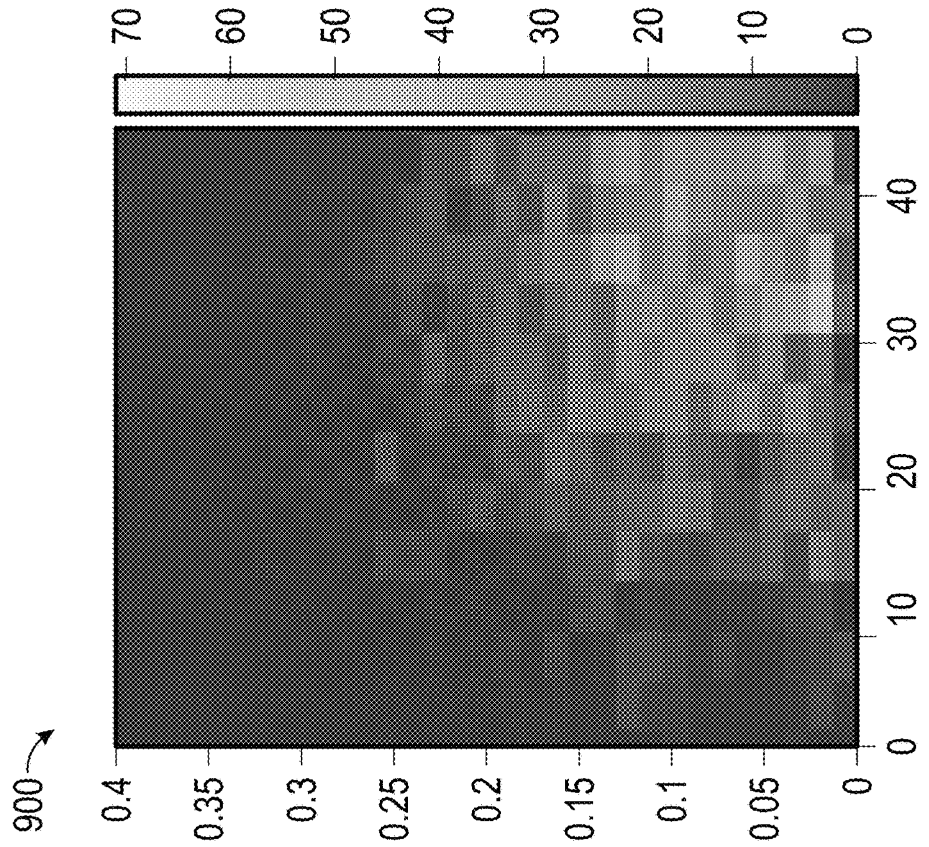
FIG. 9 is a graph showing a spectral distribution of hand wheel angle errors depending on temperature for a fleet of vehicles according to at least one of the implementations herein.

Referring to FIGS. 7-9 for another example, except here regarding temperature as an input condition, a graph 700 shows fleet data distribution collected for more than 1500 vehicles and graphs HWA error in degrees on a vertical axis versus temperature in degrees on the horizontal axis.

Graph 800 is a spectral graph of the data from graph 700 that shows the impact of temperature on steering control error (here the lateral offset of the desired path (or center of roadway)). Also, graph 900 shows steering control error in terms of HWA error degrees versus temperature. In both cases here, the correlation is clearer than with wind where here the error generally increases with increases in temperature. The data can be analyzed to determine an equation to better match temperature with an appropriate control command to maintain less HWA and lateral offset error. As mentioned, the fleet data can be analyzed similarly for many different types of vehicle parameters and control commands. In the fleet database, the input conditions, wind or temperature, can be tagged in these cases to correlate with the control commands, and in turn the desired output parameter values.

As mentioned, the calibration includes updating a calibration control command-to-input conditions correlation using the data of the fleet database, and then generating a calibration correction based on the correlation and to be used to change or replace a previous control command value for certain input conditions and associated with the inadequate performance measurement. By one form, both of these operations may be performed simultaneously by the same action, which is by using a calibration equation that factors the input conditions, the control commands, and the performance conditions. This also may include, or result in, modifying a control command or generating a new control command when a previous correlation does not exist yet and is determined by fleet or other analysis. This is referred to as adapting a control command or adaptation of a control command.

More particularly in one example correlation calibration, the updating may comprise determining a distribution of errors depending on one or more input conditions, and using the distribution to determine a correspondence between control commands and actual output parameters used to determine the performance measurements associated with one or more input conditions. The correspondence between control commands and actual output parameters are then used to determine the control command-to-input conditions correlation. This can be accomplished by using a variety of different calibration equations. One example calibration equation (1) below relies heavily on the prior calibration values while factoring the input conditions (or state) and performance measurements at once and is provided as follows:

$$c_k = F_{k-1}c_{k-1} + G_{k-1}P_{k-1} + w_k \tag{1}$$

where in this example, equation (1) is a linear, discretized system model and the fleet data is collectively factored in equation (1) because each of the variables $C_{k-1}$, $F_{k-1}$, $G_{k-1}$, $P_{k-1}$, and $w_k$ in equation (1) are a combined average, or other mathematical combination, of the variable values from multiple vehicles in the fleet. In this example, k is a current step in a series of calibration corrections for a specific control command parameter (such as steering torque or HWA) and may be considered a time instance for computing calibration corrections of a particular control command performed under certain input conditions. In addition, $c_k$ is a correction value or calibration value, and this may be a control command value for a specific type of command, such as a steering torque or HWA for example. Instead of a command value, $c_k$ can be an amount or percentage change from a previous control command value. Other variations are contemplated. Also, $F_{k-1}$ is a previous state of the vehicle that includes values from one or more input conditions as described above, where values from multiple different input conditions can be combined into a single state factor value. Also, $C_{k-1}$ is the current calibration value that is being adjusted, $G_{k-1}$ is a previous value of learning gain or in other words by one example, an inverse of the functions that describe an impact of the calibration on performance. $P_{k-1}$ is a previous performance measure, while $w_k$ is process noise, which refers to any noise from a closed loop variation on certainty, or in other words, based on an uncertainty model.

As a result, the calibration value (or modifier) $c_k$ then may be provided for updating the control commands at the vehicles. By one form, individual calibration values may be provided.

By another form, a range of calibration values $c_k$ may be provided that respectively correlate to a range of states (or input conditions) for a particular control command, such as for a range of hand wheel angles. The control commands may be provided at intervals, such as every ½ degree, and the vehicle may be arranged to interpolate control commands between the calibration values provided by the fleet server. Many variations can be used instead.

It also will be understood that instead of the calibration equation (1) used above, other equations, algorithms, or models could be used instead including those using machine learning such as neural networks, hidden Markov models, filtering models, regression or classification models, and so forth. Further, each machine learning model may be trained using fleet data collected from the vehicles having events for a parameter being updated.

Figure 10:
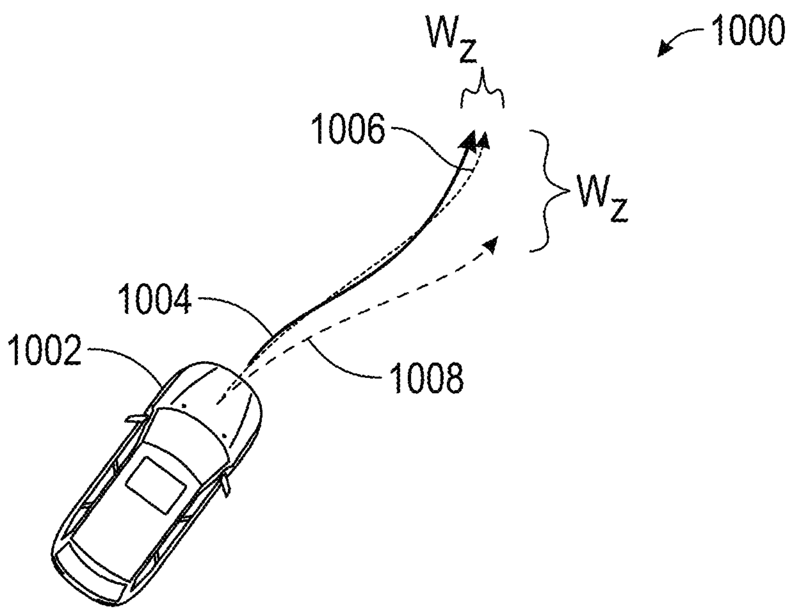
FIG. 10 is a schematic diagram showing a top view of a yaw rate error steering correction situation for a vehicle according to at least one of the implementations herein.
Figure 11:
FIG. 11 is a graph showing steering yaw rate error of the vehicle of FIG. 10 over time and according to at least one of the implementations herein.
Figure 12:
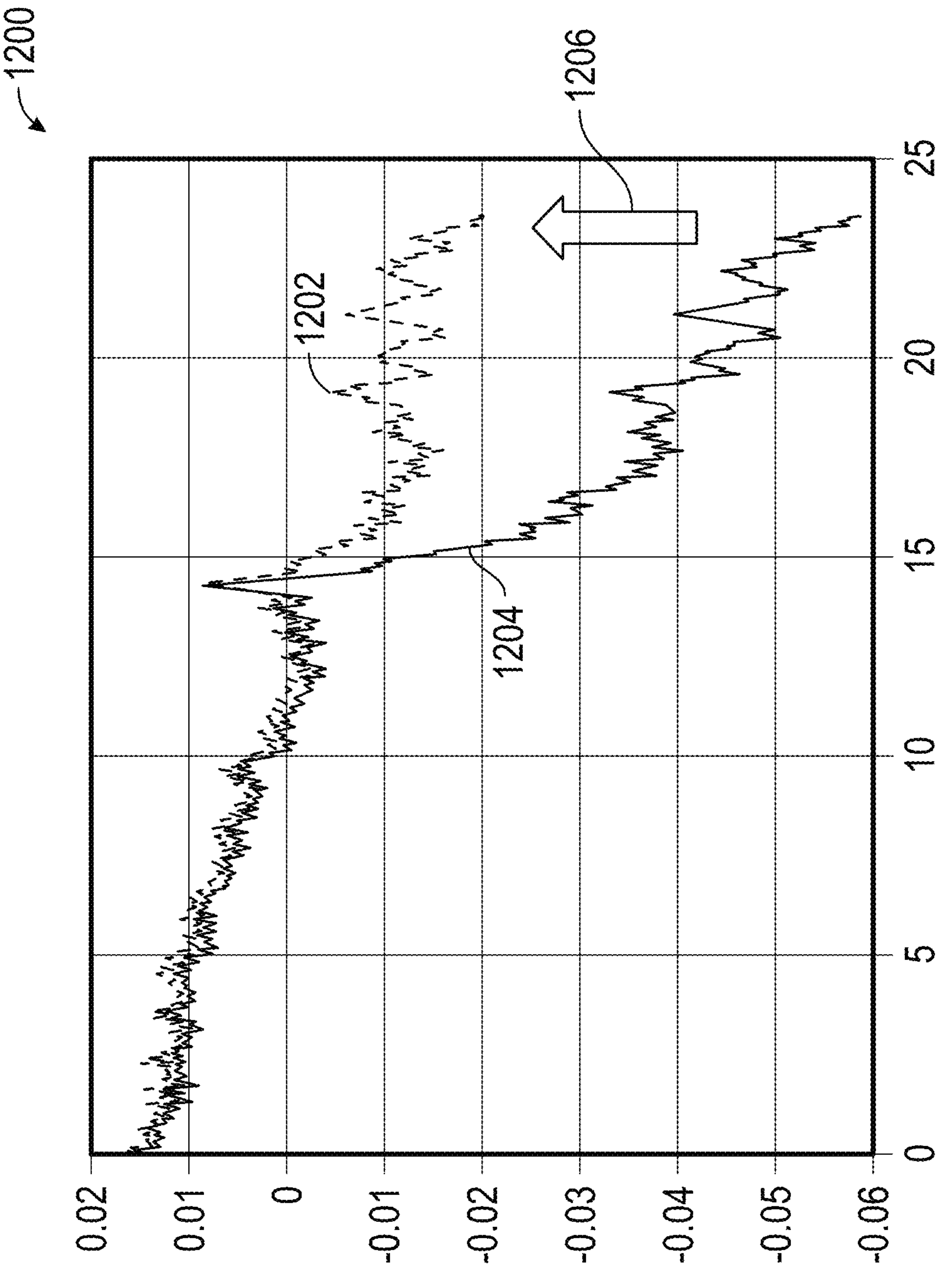
FIG. 12 is another graph comparing steering yaw rate error correction of the vehicle of FIG. 9 both with and without fleet data adaptation according to at least one of the implementations herein.

Referring to FIGS. 10-12, yet another example is provided to show the increases in performance by use of the fleet data. A vehicle situation 1000 shows a vehicle 1002 that may be pulling a trailer (not shown) and a target ground truth vehicle path 1004. An updated route (in dash line) 1006 shows the computed path determined by using the fleet data-based calibration update as described herein, while a non-updated route (shown in dash line) 1008 shows a path generated without the disclosed method and system. The parameter being analyzed is yaw rate error where Wz (Before Fix) indicates the error before the present method is used, and Wz (After Fix) indicates the error when the present method factoring fleet data is applied. As can be seen, the updated route 1006 is much closer to the ground truth route 1004 than the non-updated route 1008.

Graph 1100 shows multiple example calibration updates for vehicle 1002 according to the present calibration updating methods over time and by using fleet data. Graph 1100 shows the performance of the calibration updating where at first errors became larger and then the errors decrease after time point zero. Note that the Wz error is shown as negative on the graphs 1100 and 1200. The yaw rate error Wz for vehicle 1002 is measured by using an inertial measurement unit (IMU).

Graph 1200 compares calibration updated and non-updated yaw rate error plots 1202 and 1204 respectively for vehicle 1002 and over a short time period which may be considered a single event with a time range as recorded in the fleet database. Thus, graph 1200 shows the current vehicle situation over time, where the Wz error of the updated calibration 1202 has a significant reduction 1206 of model error versus the Wz error without the updating 1204. The example here shows a reduction in Yaw rate error of 67%.

By one option at this point, the updated calibration values, and in turn data of the updated control command to input conditions correlation may be placed in the fleet database 138 when desired. Thus, this may include just placing the calibration values in the fleet database either in a separate section or tagged to, or placed with, events with corresponding input conditions and with or without inadequate performance that is now corrected by the calibration value.

Returning to process 300, process 300 may include "test calibration correction" 318. By one option then, the method includes testing the calibration correction on a test vehicle before transmitting the calibration correction to the fleet. This may be performed on a golden vehicle and is performed by, or is authorized by, the manufacturing company or other company in control of such calibration updating. This is usually not a vehicle already owned by a consumer so that testing can be carefully and safely controlled.

Once validation is achieved on test vehicles, process 300 may include "provide calibration correction update" 320 to transmit the calibration correction to the remote vehicles, and that may be performed by a SW/FW update unit 136 (FIG. 1). As mentioned above, the transmission may be a broadcast to only those vehicles in a fleet that were grouped together and provided data for the calibration update, which may be a group by make, model, and year typically. Alternatively, any vehicle with the same make, model, and year may receive the broadcast for calibration updating. Thus, regardless of whether a vehicle experienced the inadequate performance measurement or error, the vehicle still may receive the calibration update or correction. Otherwise, vehicles may receive the calibration update that have the same DA program. By one example approach, the calibration update is provided when it is known variations in vehicle type and/or model are not otherwise relevant to specific non-critical calibration values being updated (such as for displays, audio systems, and/or on-vehicle data analysis estimates, such as for vehicle satellite-type location estimates, for example).

Process 300 may include "update correction value(s) at fleet of vehicles" 322. This involves receiving the calibration correction at the vehicle by broadcast of the calibration correction to multiple vehicles in the fleet, although a single vehicle could be updated when desired. The broadcast may be an over-the-air (OTA) broadcast. For the broadcast, a 5G wireless or mobile network may be used, or other such network that can reliably broadcast calibration data to a fleet of vehicles having transceivers and other equipment such as antennas for good quality transmissions.

The receipt of the calibration correction at the vehicles can include receiving multiple calibration corrections of multiple different types of control commands. Also, the calibration correction can be a software or firmware update of a driver assistance program or unit, such as ADAS, on the remote vehicles. Thus, the vehicle DA update unit 105 (FIG. 1) may receive the calibration update data and may replace control command values or settings (or ranges of control command values or settings) in an input condition-to-control command table or formula of a vehicle parameter. This also may include adapting a modified control command previously used or a new control command that has not been used yet. The calibration update data may be placed in memory 116 or storage 119 on the vehicle and holding the control command values. The vehicle data analysis unit 107 of the driver assistant (DA) unit 114 will then retrieve those updated values in memory or storage, or compute control command settings using those updated values. The ADAS or DA unit 114 can then operate 306 to generate new control commands based on the fleet-data.

Process 300 may include "adapt trigger data collection conditions" 324 performed by the adaptation generation unit 133 in this example. This operation involves having the data that triggered an inadequate performance determination stored in the fleet database 138. In the example shown, a separate section or index may be provided for the events that resulted in inadequate performance. Otherwise, an event in the event section of the fleet database may be tagged instead as having the inadequate performance measure. The event with the inadequate performance may identify an outdated correlation between one or more input conditions and a control command, and the resulting output parameters that caused the inadequate performance measure. The updating of the fleet database with the triggering data may be performed for each time an inadequate performance is determined, and this may include for each of multiple events of a single related inadequate determination. For example, a steering error with 10 seconds of data having 100 events (10 samplings per second) has an inadequate label or tag for all 100 events. Otherwise, a single event may be recorded as an inadequate trigger event that represents the entire 10 seconds. Other variations can be used instead.

While at least one example implementation has been presented in the foregoing detailed description, it should be appreciated that a vast number of variations exist. It should also be appreciated that the example implementations are not intended to limit the scope, applicability, or configuration of the disclosure in any way. Rather, the foregoing detailed description will provide those skilled in the art with a convenient road map for implementing the example implementations. It should be understood that various changes can be made in the function and arrangement of elements without departing from the scope of the disclosure as set forth in the appended claims and the legal equivalents thereof.

What is claimed is:

1. A method, comprising:

receiving input condition data of a plurality of remote vehicles in a fleet and used to generate automatic control commands at the remote vehicles to control the remote vehicles;

receiving actual output parameter measurement data from the remote vehicles and resulting from the use of the automatic control commands;

receiving or generating performance measurement data depending at least in part on differences between the actual output parameter measurement data and expected output parameter measurement data;

placing the performance measurement data, the input condition data, and the output parameter measurement data into one or more fleet databases;

determining whether one or more performance measurements in the fleet database are deemed inadequate;

updating a calibration control command-to-input conditions correlation using the data of the fleet database;

adapting one or more control commands related to the updating;

generating a calibration correction based on the correlation and to be used to change or replace a previous control command value associated with the inadequate performance measurement; and transmitting the calibration correction or the one or more control commands or both to the remote vehicles.

2. The method of claim 1, wherein the performance measurements are generated at the remote vehicles.

3. The method of claim 1, wherein the performance measurements are generated remotely from the remote vehicles.

4. The method of claim 1, wherein the calibration correction is part of a software or firmware update of a driver assistance program on the remote vehicles.

5. The method of claim 1, wherein the updating and generating comprises use of a calibration equation that factors fleet-based versions of one or more input conditions, one or more control commands, and one or more performance measurements.

6. The method of claim 1, wherein the updating comprises determining a distribution of errors depending on one or more input conditions, and using the distribution to determine a correspondence between the one or more control commands and the actual output parameters used to determine the performance measurements associated with one or more input conditions, and using the correspondence between the one or more control commands and the actual output parameters to determine the control command-to-input conditions correlation.

7. The method of claim 1, comprising updating the fleet database with the updated control command-to-input conditions correlation data.

8. The method of claim 1, comprising updating the fleet database with indications of which events triggers an inadequate performance measurement, wherein an event comprises corresponding input conditions, control commands, and output parameter measurements.

9. The method of claim 1, comprising testing the calibration correction on a test vehicle before transmitting the calibration correction to the fleet.

10. A computing device, comprising:
memory storing driver assistance data; and
processor circuitry forming one or more processors being communicatively coupled to the memory, the processor to operate by:
receiving input condition data of a plurality of remote vehicles in a fleet remote from the computing device and used to generate automatic control commands at the remote vehicles to control the remote vehicles;
receiving actual output parameter measurement data from the remote vehicles;
receiving performance measurements depending at least in part on differences between the actual output parameter measurement data and expected output parameter measurement data depending on the automatic control commands;
placing the performance measurement data, the input condition data, and the output parameter measurement data into a fleet database;
determining whether one or more performance measurements in the fleet database are deemed inadequate;
updating a calibration control command-to-input conditions correlation using the data of the fleet database;
generating a calibration correction based on the correlation and to be used to change or replace a previous control command value associated with the inadequate performance measurement; and
transmitting the calibration correction to the remote vehicles.

11. The device of claim 10, wherein the input condition data comprises a state of an individual vehicle comprising at least one of: location, orientation, vehicle speed, direction of motion, road surface conditions, position of objects relative to the vehicle, vehicle acceleration, vehicle deceleration, visibility, and light conditions.

12. The device of claim 10, wherein the input condition data comprises an environment of an individual vehicle comprising at least one of: outdoor temperature, humidity, and ambient pressure.

13. The device of claim 10, wherein the processor further operates by obtaining input condition data from a computer network and comprising at least one of: climate, external wind speed, outdoor temperature, precipitation, humidity, roadway surface conditions, and ambient pressure.

14. The device of claim 10, wherein the automatic control commands comprise at least one of: a steering torque or angle setting, a brake pressure setting, or an accelerator setting, and wherein the output parameter measurement data comprise at least one of: a turning angle of a wheel, a measure of deceleration, a vehicle speed, or a measure of acceleration.

15. A vehicle, comprising:
one or more controllers, comprising:
memory;
processor circuitry forming one or more processors communicatively coupled to the memory; and
a driving assistance unit being operated by the one or more processors, the processor to operate by:
generating input condition data used to generate an automatic control command at the vehicle to control the vehicle,
generating output parameter measurement data resulting from use of the automatic control command,
generating performance measurement data depending at least in part on differences between the output parameter measurement data and expected output parameter measurement data of the automatic control command,
transmitting the performance measurement data, the input condition data, and the output parameter measurement data to a fleet data adaptation computing device receiving transmissions from a plurality of remote vehicles in a fleet and placing data of the performance measurements, the input conditions, and the output parameter measurements into a fleet database,
receiving, over-the-air (OTA), a calibration correction from the fleet data adaptation computing device, wherein the fleet data adaptation computing device generates the calibration correction by determining whether a performance measurement in the fleet database is deemed inadequate, determining an updated calibration control command-to-input conditions correlation using the data of the fleet database, and generating the calibration correction based on the correlation, and
replacing or modifying a previous inadequate control command value at the vehicle by using the calibration correction.

16. The vehicle of claim 15, wherein the performance measurement data is deemed inadequate when it is determined that an error is sufficiently large to impact safety or causes a reduction in vehicle user experience quality.

17. The vehicle of claim 15, wherein the receiving of the calibration correction is part of a broadcast of the calibration correction to multiple vehicles in the fleet.

18. The vehicle of claim 15, wherein the receiving of the calibration correction comprises receiving multiple calibration corrections of multiple different types of control commands.

19. The vehicle of claim 15, wherein the performance measurements, state, and environment of the vehicle and the calibration correction is transmitted with 10-20 Gbps over a 5G network.

20. The vehicle of claim 15, wherein transmission of the input conditions of the vehicle is encrypted.

* * * * *